Nov. 15, 1955 W. S. W. EDGAR, JR 2,724,014

PHOTOELECTRIC TAPE READER

Filed Oct. 2, 1952 4 Sheets-Sheet 1

INVENTOR.
W. S. W. EDGAR, JR.
BY Edward R. Hyde Jr.
ATTORNEY

Nov. 15, 1955 W. S. W. EDGAR, JR 2,724,014
PHOTOELECTRIC TAPE READER
Filed Oct. 2, 1952 4 Sheets-Sheet 2

INVENTOR.
W. S. W. EDGAR, JR.
BY Edward R. Hyde Jr.
ATTORNEY

INVENTOR.
W.S.W.EDGAR, JR.
BY Edward R. Hyde Jr.
ATTORNEY

INVENTOR.
W.S.W. EDGAR, JR.
BY Edward R. Hyde Jr.
ATTORNEY

United States Patent Office 2,724,014
Patented Nov. 15, 1955

2,724,014

PHOTOELECTRIC TAPE READER

William Stanley Westerman Edgar, Jr., New York, N. Y., assignor to The Western Union Telegraph Company, New York, N. Y., a corporation of New York Application October 2, 1952, Serial No. 312,771

12 Claims. (Cl. 178—17)

This invention relates to a phototube system for reading perforated telegraph tape and more particularly to a phototube system adapted to be mounted on a conventional telegraph reperforator.

A principal object of this invention is to provide a phototube reader devoid of any optical system of lenses or light conducting tubes.

Another object is to provide a compact phototube reader easily adapted to be mounted on a telegraph reperforator.

A customary telegraph reperforator interprets received signals and impresses the characters represented thereby on tape in the form of perforations employing a five point code. Associated with the reperforator is a tape sensing device which reads the intelligence represented by the perforations for the purpose of retransmission. Heretofore the sensing device or reader comprised an arrangement of reciprocating pins each of which would complete a circuit upon sensing a perforation. Because this mechanical type sensing device is limited as to speed of operation due to mechanical inertia, the possibility of employing photoelectric cells was realized. However, in order to sense the five points of the tape simultaneously it has been heretofore necessary to resort to systems of lenses, reflectors or light conducting tubes to direct the light to the photoelectric cells. Such optical systems are in themselves large and bulky. In addition, the light diffusion and dissipation caused thereby dictates the employment of a large light source which further adds to the bulk of the system. The large size of a sensing device employing such optical systems make them impractical for use with a telegraph reperforator.

In accordance with this invention, a photoelectric sensing device or reader is provided eliminating the use of light reflecting devices. This feature is brought about by a precise arrangement of the phototubes and light source.

This and other features of the invention will become apparent from the following example of a specific embodiment thereof. Referring to the drawings.

Figure 1:
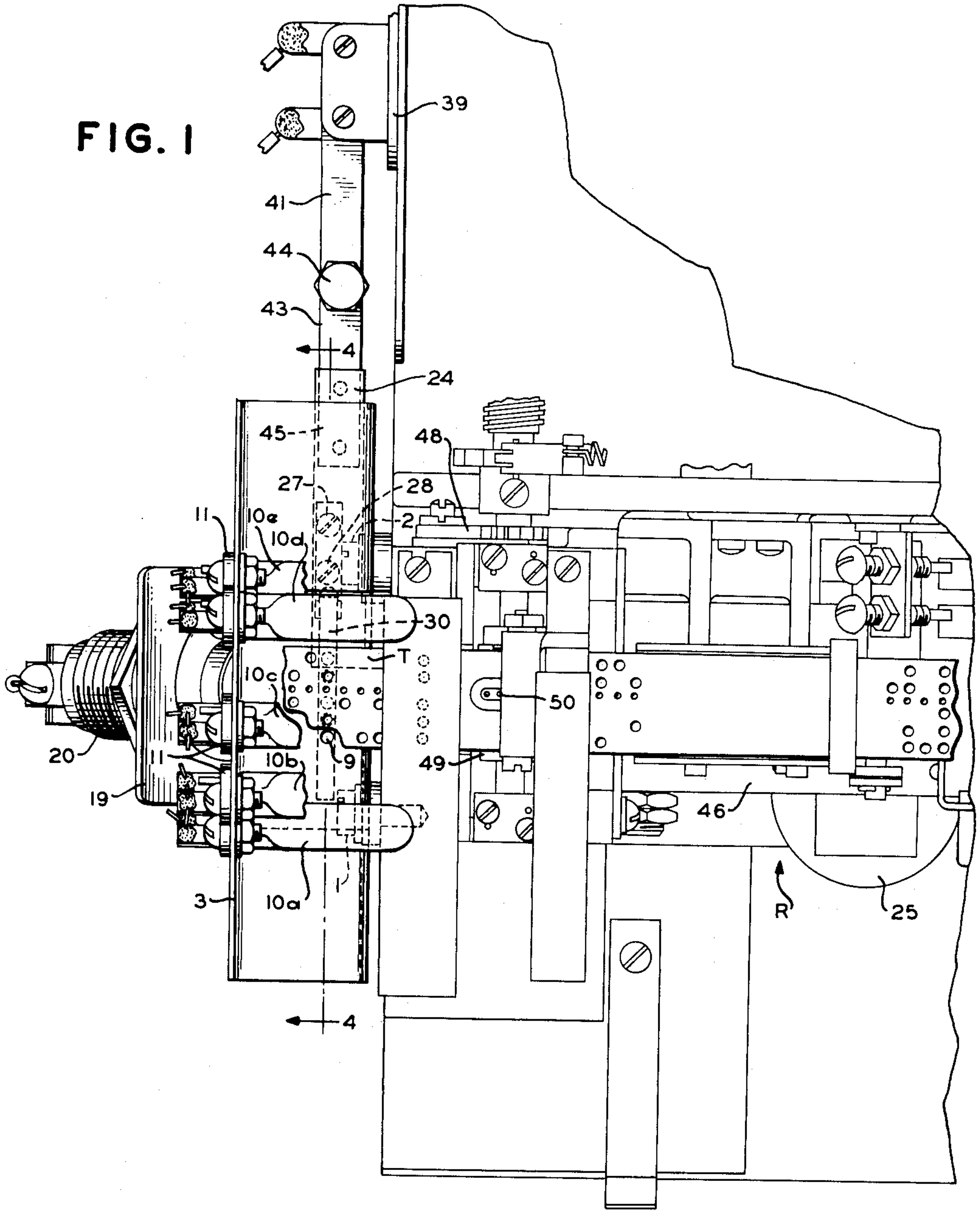
Fig. 1 is a plan view of a phototube reader mounted on a telegraph reperforator.
Figure 2:
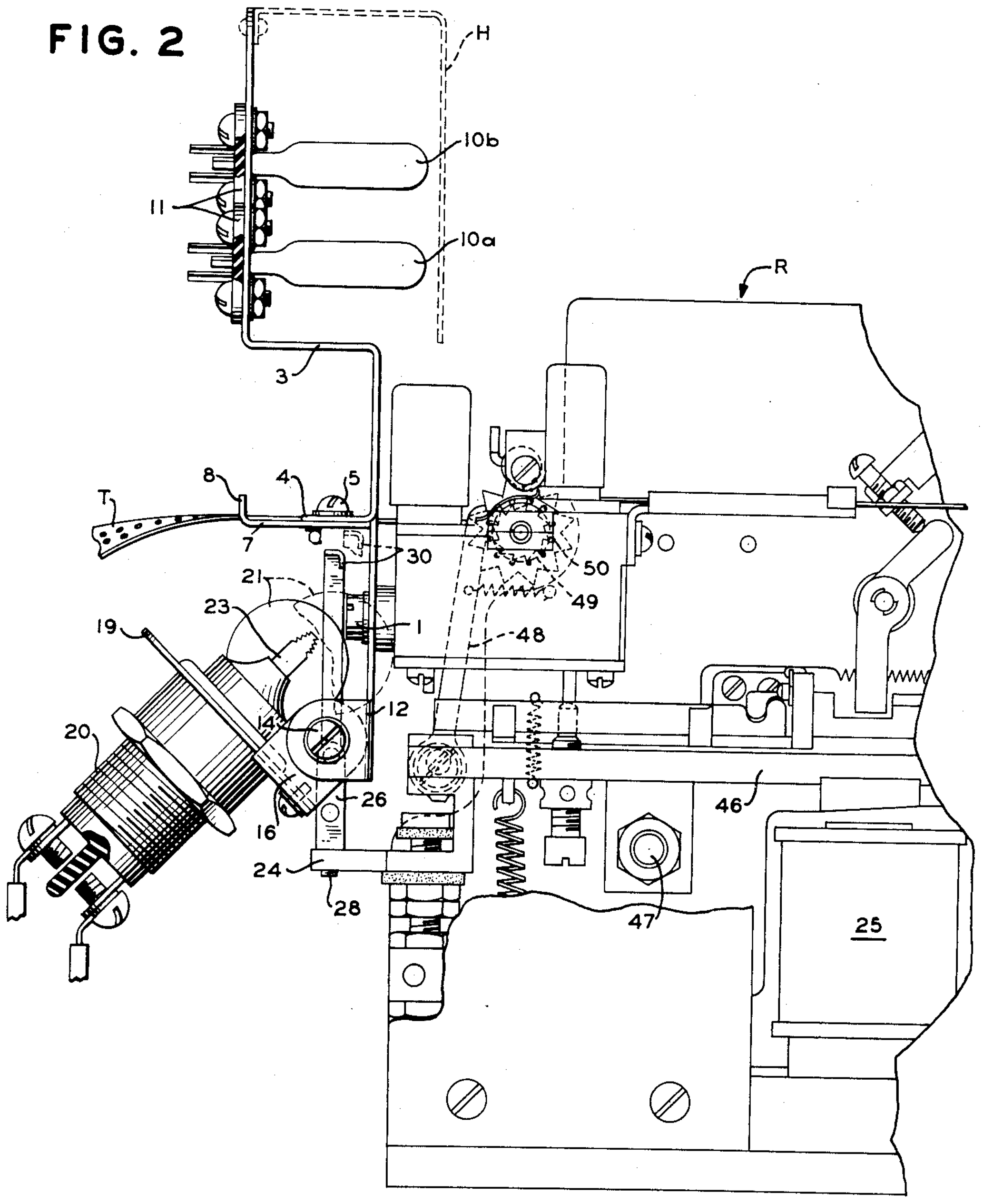
Fig. 2 is a side elevation of the unit of Fig. 1.
Figure 3:
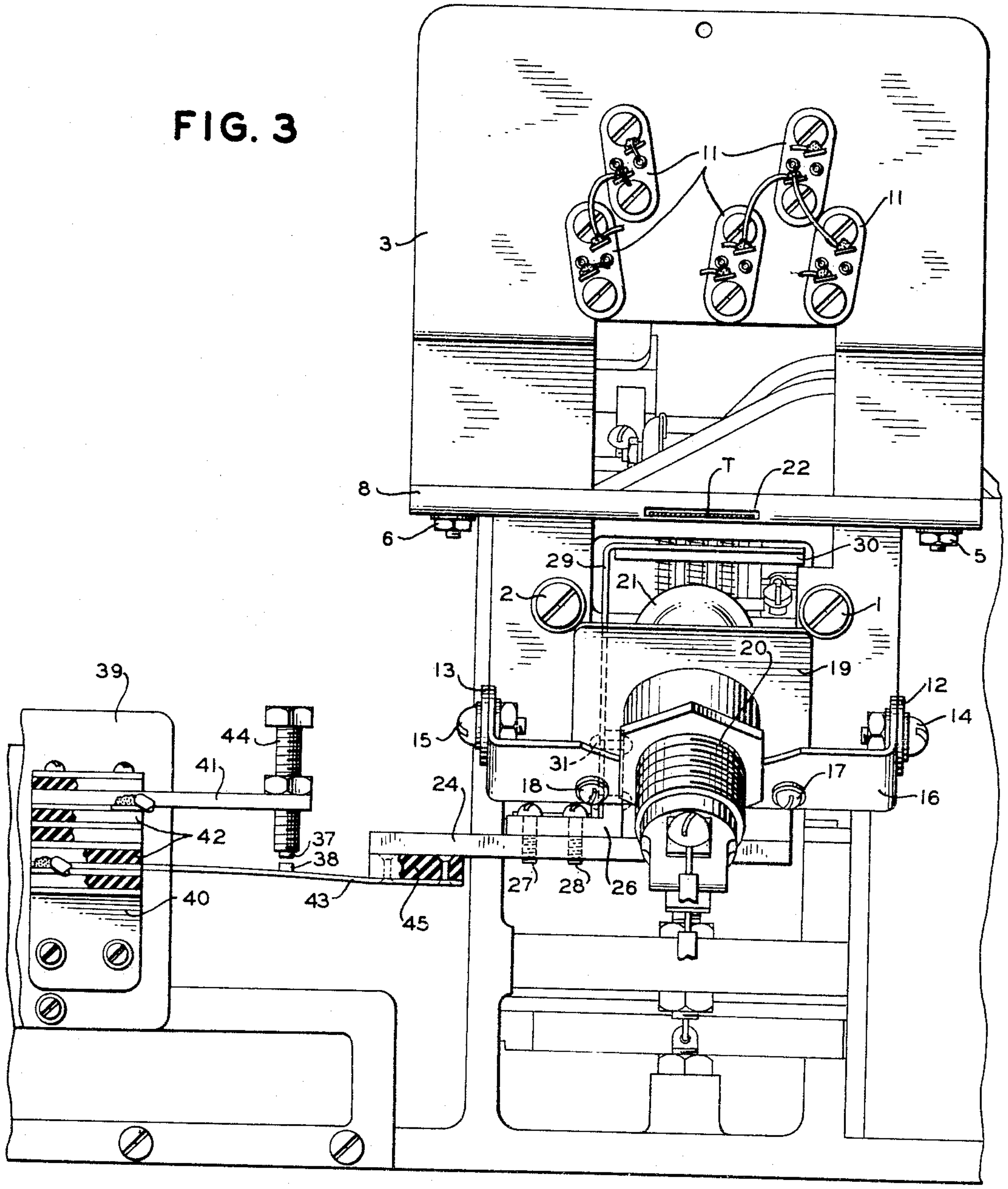
Fig. 3 is an end elevation of the unit of Fig. 1.

Referring to the drawings, R represents a conventional telegraph reperforator similar to that shown in U. S. Patent No. 2,252,852 to Hoover. As more fully disclosed in this patent the perforated telegraph tape T is advanced in a step by step movement by pawl 48 which engages a ratchet connected to feed wheel 49. Pins 50 are circumferentially spaced around feed wheel 49 to cooperate with tape feed holes to effect feeding. The tape discharge end of the reperforator is adapted to receive mounting bolts 1 and 2 which securely hold the main mounting bracket 3 as clearly shown in Fig. 2. Bracket 3 on which the elements of the reader are mounted is preferably made of sheet metal and shaped to form an upper vertical mounting section, a small horizontal section and a lower vertical mounting section as shown in Fig. 2. At each side of the lower mounting section, a portion thereof is cut and bent to a horizontal position to form lugs 4 which receive bolt and nut assemblies 5 and 6 and serve as a mounting for tape feed guide 7. Guide 7 comprises a flat horizontal section located at the tape discharge slot of reperforator R, and an upstanding lip 8. Referring to Fig. 3, it is seen that lip 8 has a slot 22 therethrough to pass tape T. Located on the horizontal section of guide 7 over which the tape T passes are five openings 9 corresponding to the five perforation points of the tape.

The upper vertical section of bracket 3 forms a mounting for phototubes 10*a* to 10*e*. The embodiment herein shown includes five phototubes corresponding to the five code points of the tape being sensed. If the code employed is other than the customary five point code, the number of photocells 10 and openings 9 would of course be chosen to correspond to the number of points being sensed. The phototubes disclosed are photo-conductive cells of the Cetron 702 type though other types could be equally well employed. Tube sockets 11 are fastened to bracket 3 by means of bolts and nuts as shown in Figs. 2 and 3. Three phototubes 10*a*, 10*c* and 10*e*, as therein shown, are arranged in a horizontal line with sufficient space therebetween to allow light beams associated with the two upper phototubes 10*b* and 10*d* to pass uninterrupted. It should be noted that other arrangements of the phototubes might be employed without departing from the scope and spirit of the invention. For example, the two upper cells might be located between the lower three and on the line therewith. Another arrangement would be to locate all five phototubes along an arc. The arrangement herein shown was chosen on the basis of mechanical convenience. Housing H is mounted on the upper end of bracket 3 enclosing the phototubes thereby preventing stray light from effecting the said phototubes. The inner surface of housing H is preferably of a low-light reflecting nature.

The bottom two corners of bracket 3 are cut and bent to form two vertical lugs 12 and 13 which receive bolt and nut assemblies 14 and 15 and serve as a pivotal mounting for bracket 16. The said bracket has two bolt holes therein to receive bolt and nut assemblies 17 and 18 which fasten plate 19 to bracket 16. Plate 19 has an opening therein to receive light socket assembly 20 which holds lamp 21 provided with V-shaped filament 23, as clearly shown in Fig. 2. Socket assembly 20 is frictionally engaged by the opening in plate 19 thereby permitting a turning adjustment of lamp 21.

It is particularly desirable that a substantial point light source is provided in the viewing plane defined by openings 9 and phototubes 10*a* to 10*e*. This is accomplished by turning socket 20 to position V-shaped filament 23 in a vertical position. As viewed from above, therefore, the filament presents a linear light source in a direction longitudinally of the tape. Bracket 16 may be adjusted about its pivot to position filament 23 to intersect the viewing plane, thereby centering the cones of light on the active portion of their respective phototubes. In Fig. 2, the dotted representation of lamp 21 indicates the operative location for said lamp.

Figures 4, 5:
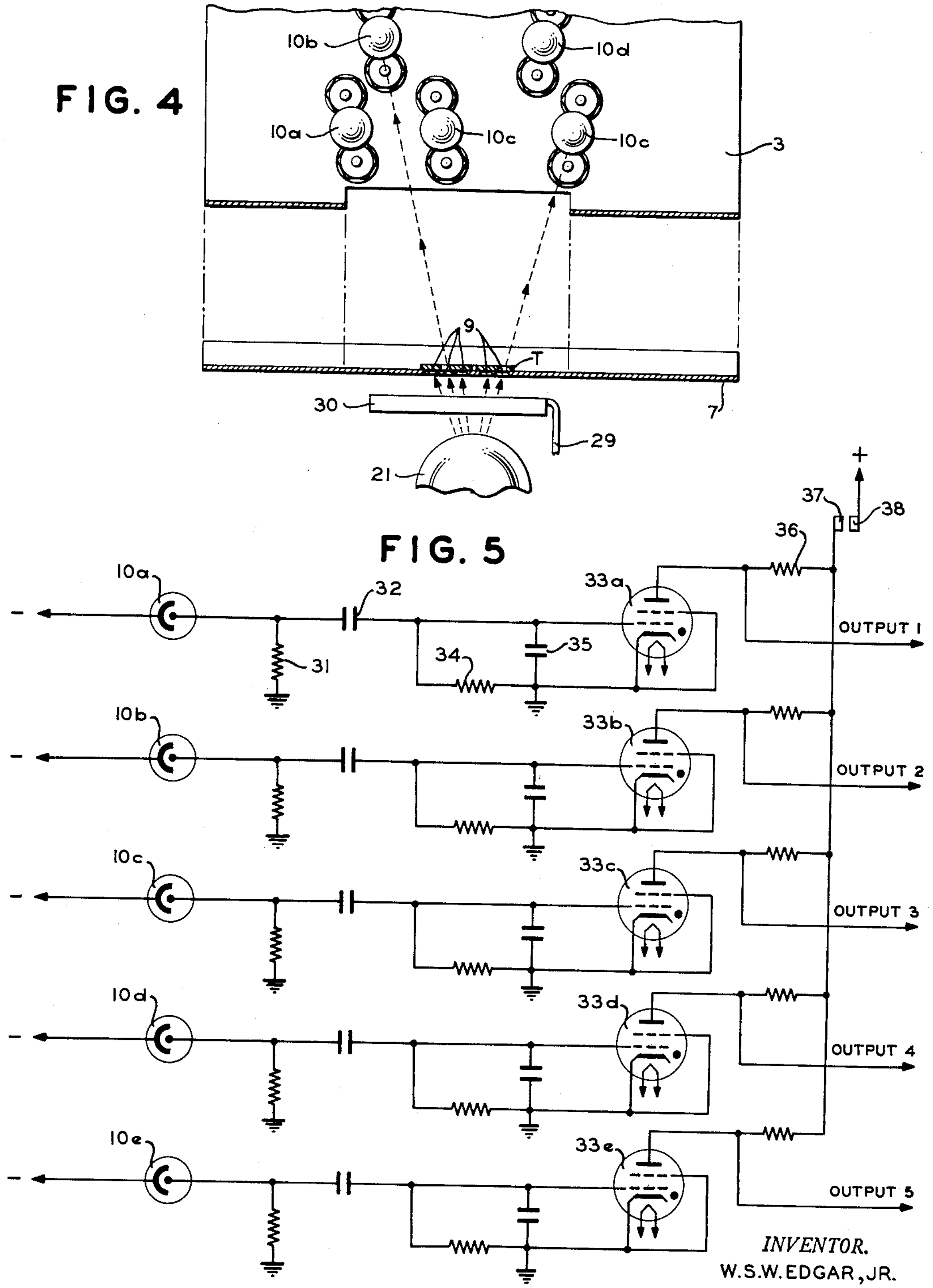
Fig. 4 is a sectional view taken on the line 4—4 of Fig. 1.
Fig. 5 is a schematic diagram of the electrical circuit employed to interpret the intelligence scanned by the phototubes.

An important feature of the invention is the relative location of phototubes 10*a* to 10*e*, openings 9 and the filament of lamp 21. The rays from the light source will form cones after passing through round openings 9. There will be five such cones in the embodiment disclosed. The distance of each phototube from its respective opening 9 is such that the said phototube just cuts off the complete cone of light. This adjustment need not be achieved exactly, but merely within practical limits. Referring to Fig. 4, it can readily be seen that the relative position of the light source and the lower group of three phototubes can be set whereby the three cones of light are just fully intercepted by the said three phototubes. This setting prevents any part of the three light cones from effecting the operation of the upper two phototubes. It may also be readily seen that the upper two phototubes, being of the same diameter as the lower three, will not completely cut off their respective cones of light since the diameter of the cones is larger at the upper position. The small amount of light thus passed by the upper two phototubes can be neglected since it has passed all the phototubes and can therefore have no adverse effects on the light sensitive system.

From a practical standpoint, the diameter and spacing of openings 9 are fixed by the type of telegraph tape and code employed. Also, the diameter of the phototubes is fixed since they are of a stock type commercially available. It may therefore be seen that the variables involved in determining the relative locations of the elements are (1) the distance from the light source to an opening 9, and (2) the distance from the said opening to its respective phototube. It has been found that this relationship may be expressed as follows: the ratio of the distance from the light source to an opening 9 over the distance from the light source to the respective phototube is approximately equal to the ratio of the diameter of opening 9 over the diameter of the phototube.

Referring now to Figs. 2 and 3, member 24 is an extension of armature 46 of the reperforator feed magnet 25, the operation of which is set forth in the above-mentioned patent to Hoover. As therein disclosed, magnet 25 is energized at a time just prior to a stepping of the tape. The deenergization of magnet 25 causes the tape to advance one step which is the distance between two transverse lines of perforations. Mounted on member 24 is L-shaped bracket 26 secured thereto by bolts 27 and 28. Leaf spring 29 is securely fastened to the upstanding arm of L-shaped bracket 26 by means of bolts 31. The upper end of leaf spring 29 has secured thereon, in any suitable fashion, shutter 30. As shown in Fig. 2, shutter 30 comprises a flat horizontal section and a depending lip. The purpose of the lip is to lend rigidity to the shutter thereby preventing vibration thereof. From the above description it may be seen that upon energization of magnet 25, shutter 30 will swing to the dotted line position shown in Fig. 2 thereby permitting light from lamp 21 to reach the scanning area to effect reading of the transverse line of tape perforations located over openings 9 at that time. Deenergization of magnet 25 repositions shutter 30 cutting off light to the scanning area.

Referring now to Fig. 5, there is shown a preferred circuit for interpreting the intelligence scanned by the phototubes. Five gaseous discharge tubes **33*a* to 33*e* of the thyratron type are shown, each associated with a respective phototube 10*a* to 10*e*. Since the circuit for each phototube is the same, for purposes of description reference will be made to only one such circuit. The cathode of each phototube such as 10*a* is connected to a negative source of potential. The anode of each phototube is coupled to its respective thyratron through coupling condenser 32 and to ground through resistor 31. Grid bias is supplied to the control grid of each thyratron through biasing resistor 34 shunted by by-pass condenser 35. The anode of each thyratron is coupled to positive battery through its respective load resistor 36 and common contacts 37 and 38. The contact assembly as shown in Fig. 3 comprises a flat vertical mounting plate 39 secured in any suitable manner to reperforator R. Bracket 40 is mounted on plate 39 by suitable bolt and nut assemblies and includes an outwardly extending portion to which is secured contact arm 41. Spacers 42, of insulating material, serve to locate leaf spring 43 a predetermined distance from contact arm 41. The outer end of contact arm 41 receives adjusting bolt 44 upon which contact 37 is mounted. Contact 38 is mounted on the upper side of leaf spring 43 at a point directly under contact 37. Block 45 is located at the outer end of leaf spring 43 to engage member 24 to maintain contacts 37, 38 open when member 24 is in its lowered position due to deenergization of magnet 25**.

Commercially available phototubes of a particular type often have greatly varying characteristics. Hence direct coupling between the phototube circuit and the control grid of the thyratron tube is impractical since the coupling circuit would require adjusting for each tube. This invention eliminates this problem by providing a capacity coupling thereby isolating the D. C. current of the phototube from the control grid of the thyratron. The thyratron tube is thereby controlled by the change of phototube current rather than by its actual value as when direct coupling is employed. This arrangement permits the use of phototubes having different characteristics of wide limits. However, in order to employ capacity coupling, a varying signal must be developed from the phototube. This is accomplished by employing a shutter as herein disclosed.

A cycle of operation may be traced as follows: Upon energization of feed magnet 25, armature 46 is pivoted about 47 thereby raising member 24. This movement of member 24 swings shutter 30 to the right as viewed in Fig. 2 allowing light from lamp 21 to reach the five openings 9 in tape guide 7. At this time in the cycle, a transverse line of perforation points of tape T will coincide with openings 9. The transverse line of perforation points are perforated in a combination representing a particular character. At each point where a perforation occurs, a cone of light will be formed to actuate a phototube 10. It can, therefore, be seen that a combination of phototubes will be actuated in accordance with the particular character represented on the portion of tape in scanning position at the time shutter 30 is opened. Referring now to the circuit diagram of Fig. 5, each biasing resistor 34 provides a slight negative bias for the control grid of its respective thyratron tube. This negative bias is insufficient by itself to prevent the thyratron from firing upon application of a positive potential to the anode. However, if phototube **10*a* is rendered conductive by a cone of light, the voltage drop across phototube load resistor 31 causes a negative pulse to be applied to the control grid of thyratron 33*a* thereby biasing the said thyratron to cut-off. Contacts 37, 38 are adjusted to close at the end of the movement of member 24. Shutter 30 is caused to open at the start of the movement of member 24 thereby insuring conditioning of the thyratron control grids prior to the closing of contacts 37, 38. When the latter close, a positive potential is applied to the anode of each thyratron causing conduction thereof if the respective phototube is not actuated by a cone of light. A combination of thyratrons 33*a* to 33*e*** will, therefore, be rendered conductive in accordance with the combination of tape perforations scanned.

An output lead is connected to the anode of each thyratron. If one of the latter tubes does not fire upon the closing of contacts 37, 38, it can be seen that the full positive supply voltage will appear in the respective output lead through load resistor 36. However, upon firing of a thyratron, the voltage applied to the respective output lead will be a small value, measured by the voltage drop across the tube.

Deenergization of magnet 25 repositions member 24 thereby first opening contacts 37, 38 and thereafter closing shutter 30. When the latter contacts open, the plate circuit of each thyratron tube is broken thereby returning the circuit to normal standby condition.

While there is herein shown a specific embodiment of the invention, it is understood that various modifications could be made without departing from the spirit of the invention and the scope of the appended claims.

What is claimed is:

1. In a device for sensing perforated telegraph tape having transverse perforations, a substantially point light source in a direction transverse to the tape, a tape guide member with a straight line arrangement of openings therein corresponding in number and position to the tape perforations to thereby form a plurality of diverging cones of light when said perforations in the tape are in alignment with the openings in said guide, a plurality of phototubes each located axially of a cone of light at a distance from the guide where the diameter of said cone is approximately equal to the diameter of the respective phototube, circuit means connected to said phototubes, means located between said light source and said plurality of phototubes to periodically cut off the light to said phototubes and means to operate said last named means.

2. A device for sensing perforated telegraph tape having transverse perforations consisting of a substantially point light source in a direction transverse to the tape, a tape guide member with a straight line arrangement of openings therein corresponding in number and position to the tape perforations, a shutter disposed between said light source and said guide member, means to actuate said shutter thereby allowing light from said light source to reach said guide member to form a plurality of diverging cones of light when the tape perforations are in alignment with the openings in the guide, a plurality of phototubes each located axially of a cone of light at a distance from the guide where the diameter of said cone is approximately equal to the diameter of the respective phototube, and mounting means for said light source, tape member, shutter and phototubes.

3. In a device for sensing perforated telegraph tape having transverse perforations, a tape guide member having a straight line arrangement of openings therein corresponding in number and position to the tape perforation points, a substantially point light source in a direction transverse to the tape located adjacent said guide member thereby forming a plurality of diverging light cones when said perforations in the tape are in alignment with the openings in said guide, a plurality of phototubes positioned at the opposite side of said guide member from said light source, each phototube being located to intercept a light cone, the distance from the light source to an opening in said guide member being in a ratio to the distance from said light source to the respective phototube as the diameter of said opening is in a ratio to the diameter of said respective phototube, circuit means connected to said phototubes, means located between said light source and said plurality of phototubes to periodically cut off the light to said phototubes and means to operate said last named means.

4. A device for sensing perforated telegraph tape having transverse lines of perforations consisting of a tape guide member having a straight line arrangement of openings therein corresponding in number and position to the tape perforation points, a substantially point light source in a direction transverse to the tape located adjacent said guide member, a plurality of phototubes positioned at the opposite side of said guide member from said light source, a shutter disposed between said light source and said phototubes, means to actuate said shutter thereby allowing light from said light source to reach said guide member to form a plurality of diverging cones of light when the tape perforations are in alignment with the openings in the guide, each phototube being located to intercept one of said light cones, the distance from the light source to each opening in said guide member being in an approximate ratio to the distance from said light source to each respective phototube as the diameter of said opening is in a ratio to the diameter of said respective phototube, and mounting means for said light source, tape guide member, shutter and phototube.

5. In a device for sensing perforated telegraph tape having transverse perforations therein, a tape guide member having a straight line arrangement of openings therein corresponding in number and position to the tape perforations, a substantially point light source in a direction transverse to the tape, a plurality of phototubes positioned at the opposite side of said guide member from said light source, a shutter disposed between said light source and said phototubes adapted to be displaced so as to enable light from said light source to reach said guide member to form a plurality of diverging cones of light when the tape perforations are in alignment with the openings in the guide, circuit means coupled to said phototubes, said circuit means including a pair of normally open contacts, and actuating means to displace said shutter and close said contacts.

6. In a device for sensing perforated telegraph tape having transverse perforations therein, a substantially point light source measured in a direction transverse to the tape, adjustable mounting means for said light source, said mounting means providing an axial adjustment of the light source and an adjustment longitudinal of the tape, a tape guide member having a straight line arrangement of openings therein corresponding in number and position to the tape perforations, a shutter disposed between said light source and said guide member adapted to be displaced whereby light from said light source will reach said guide member to form a plurality of diverging cones of light when said tape perforations are in alignment with the openings in the said guide, a plurality of phototubes each located axially of a cone of light at a distance from the guide where the diameter of said cone is approximately equal to the diameter of the respective phototube.

7. In a device for sensing perforated telegraph tape having transverse perforations therein, a substantially point light source measured in a direction transverse to the tape, a tape guide member having a straight line arrangement of openings therein corresponding in number and position to the tape perforations, a shutter disposed between said light source and said guide member adapted to be displaced whereby light from said light source will reach said guide member to form a plurality of diverging cones of light when said tape perforations are in alignment with the openings in the said guide, means to advance tape across the openings of the said guide, a plurality of phototubes each located axially of a cone of light at a distance from the guide where the diameter of said cone is approximately equal to the diameter of the respective phototube.

8. In a device for sensing perforated telegraph tape having transverse perforations therein, a tape guide member having a straight line arrangement of openings therein corresponding in number and position to the tape perforation points, means to advance tape across the openings of the said guide, a substantially point light source measured in a direction transverse to the tape located adjacent said guide member thereby forming a plurality of diverging light cones when said tape perforations are in alignment with said guide openings, adjustable mounting means for said light source, said mounting means providing an axial adjustment for said light source and an adjustment longitudinal of the tape, a plurality of phototubes positioned at the opposite side of said guide member from said light source, each phototube being located to intercept a light cone, the distance from the light source to an opening in said guide member being in a ratio to the distance from the said light source to the respective phototube as the diameter of said guide opening is in a ratio to the diameter of said respective phototube, circuit means connected to said phototubes, means located between said light source and said plurality of phototubes to periodically cut off the light to said phototubes and means to operate said last named means.

9. In a device for sensing perforated telegraph tape having transverse perforations therein, a tape guide member having a straight line arrangement of openings therein corresponding in number and position to the tape perforation points, means to advance tape across the openings of said guide, a substantially point light source measured in a direction transverse to the tape, a plurality of phototubes positioned at the opposite side of said guide member from said light source, a shutter disposed between said light source and said phototubes and adapted to be displaced whereby light from said light source will reach said guide member to form a plurality of diverging cones of light when the tape perforations are in alignment with the openings in the guide, each phototube being located to intercept one of said cones of light, the distance from the light source to an opening in said guide member being in a ratio to the distance from the said light source to the respective phototube as the diameter of said guide opening is in a ratio to the diameter of said respective phototube, circuit means coupled to said phototubes, said circuit means including a pair of normally open contacts and actuating means to displace said shutter and close said contacts.

10. In a device for sensing perforated telegraph tape having transverse perforations therein, a tape guide member having a straight line arrangement of openings therein corresponding in number and position to the tape perforations, a substantially point light source in a direction transverse to the tape, a plurality of phototubes positioned at the opposite side of said guide member from said light source, a shutter disposed between said light source and said phototubes adapted to be displaced to enable light from said light source to reach said guide member to form a plurality of diverging cones of light when the tape perforations are in alignment with the openings in the guide, circuit means coupled to said phototubes, said circuit means including a pair of normally open contacts, and actuating means to sequentially displace said shutter and close said contacts at the start of a scanning interval and sequentially reposition the shutter and open the contacts at the end thereof.

11. In a sensing device of the character described for analyzing perforated telegraph tape having transverse perforations therein, a substantially point light source in a direction transverse to the tape, a tape guide member having a straight line arrangement of openings therein corresponding in number and position to the tape perforations, a movable light shutter disposed between said light source and said guide member, means to actuate said shutter to permit light from said light source to reach said guide member thereby forming a plurality of diverging cones of light when the tape perforations are in alignment with the openings in the guide, a plurality of phototubes each located axially of a cone of light at a distance from the guide where the diameter of said cone is approximately equal to the diameter of the respective phototube, and mounting means for said light source, tape guide member, and shutter and phototubes.

12. In a sensing device of the character described for analyzing perforated telegraph tape having transverse lines of perforations therein, a tape guide member having a straight line arrangement of openings therein corresponding in number and position to the tape perforations, a substantially point light source in a direction transverse to the tape located adjacent said guide member, a plurality of phototubes positoned at the opposite side of said guide member from said light source, a movable light shutter disposed between said light source and said phototubes, means to actuate said shutter thereby allowing light from said light source to reach said guide member to form a plurality of diverging cones of light when the tape perforations are in alignment with the openings in the guide, each phototube being located to intercept one of said light cones, the distance from the light source to each opening in said guide member being in an approximate ratio to the distance from said light source to each respective phototube as the diameter of said opening is in a ratio to the diameter of said respective phototube, and mounting means for said light source, tape guide member, shutter and phototube.

References Cited in the file of this patent

UNITED STATES PATENTS

| | | |
|---|---|---|
| 2,229,125 | Pray | Jan. 21, 1941 |
| 2,298,757 | Evans | Oct. 13, 1942 |
| 2,302,271 | Smith | Nov. 17, 1942 |